United States Patent
Leymann et al.

(10) Patent No.: US 6,928,477 B1
(45) Date of Patent: Aug. 9, 2005

(54) AVAILABILITY AND SCALABILITY IN CLUSTERED APPLICATION SERVERS BY TRANSMITTING EXPECTED LOADS OF CLIENTS TO LOAD BALANCER

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 09/712,629

(22) Filed: Nov. 14, 2000

(30) Foreign Application Priority Data

Nov. 18, 1999 (EP) .............................................. 99122914

(51) Int. Cl.⁷ ........................ G06F 15/173; G06F 15/16
(52) U.S. Cl. .................... 709/226; 709/225; 709/219; 709/229
(58) Field of Search ................................. 709/223–226, 709/217–219, 227–229, 239–244, 203; 379/265.01–265.09; 370/351; 718/105

(56) References Cited

U.S. PATENT DOCUMENTS

| | | | | |
|---|---|---|---|---|
| 4,800,488 A | * | 1/1989 | Agrawal et al. ............ | 709/225 |
| 5,239,653 A | * | 8/1993 | Cubero-Castan et al. ... | 709/242 |
| 5,539,883 A | * | 7/1996 | Allon et al. ................ | 718/105 |
| 5,761,507 A | * | 6/1998 | Govett ........................ | 718/101 |
| 5,828,847 A | * | 10/1998 | Gehr et al. .................. | 709/239 |
| 5,987,502 A | * | 11/1999 | Banks et al. ................ | 709/203 |
| 6,076,105 A | * | 6/2000 | Wolff et al. ................. | 709/223 |
| 6,182,139 B1 | * | 1/2001 | Brendel ....................... | 709/226 |
| 6,249,801 B1 | * | 6/2001 | Zisapel et al. .............. | 718/105 |
| 6,434,626 B1 | * | 8/2002 | Prakash et al. ............. | 709/238 |
| 6,493,446 B1 | * | 12/2002 | Cherry .................. | 379/265.05 |
| 6,560,649 B1 | * | 5/2003 | Mullen et al. .............. | 709/226 |
| 6,597,684 B1 | * | 7/2003 | Gulati et al. ................ | 370/351 |
| 6,681,251 B1 | * | 1/2004 | Leymann et al. ........... | 709/226 |

FOREIGN PATENT DOCUMENTS

| | | | | |
|---|---|---|---|---|
| GB | | 2336449 A | * 10/1999 | ............. G06F/9/46 |

* cited by examiner

*Primary Examiner*—Bunjob Jaroenchonwanit
*Assistant Examiner*—Joseph E. Avellino
(74) *Attorney, Agent, or Firm*—Lynn L. Augspurger; Floyd A. Gonzalez (57) ABSTRACT

The invention relates to a technology of workload balancing for improved availability within a multitude of applications-servers and a multitude of application-clients interconnected with said application-servers by a communication network. A proposed method comprises a first-step, wherein an application-client is caching availability data of a subset of currently active application-servers as potential target application-servers. The method comprises a second-step, wherein for execution of an application-request the application-client selects an application-server from the subset based on a load-balancing decision of the application-client as target application-server. Finally the application-request is sent to the target application-server.

39 Claims, 3 Drawing Sheets

AVAILABILITY AND SCALABILITY IN CLUSTERED APPLICATION SERVERS BY TRANSMITTING EXPECTED LOADS OF CLIENTS TO LOAD BALANCER

FIELD OF THE INVENTION

The present invention relates to a method and means of increasing the availability within a multitude of application servers providing services to a multitude of application clients. More particularly, the invention relates to a method and means of increasing the availability and scalability by workload balancing and distribution of workloads to improve resource consumption.

BACKGROUND OF THE INVENTION

Enterprises depend on the availability of the systems supporting their day-to-day operations. A system is called available if it is up and running and is producing correct results. In a narrow sense, availability of a system is the fraction of time it is available. MTBF denotes the mean time before failure of such a system is denoted, i.e. the average time a system is available before a failure occurs (this is the reliability of the system). Ideally, the availability of a system is 1. Today, a system can claim high availability if its availability is about 99.999% (it is called fault tolerant if its availability is about 99.99%). J. Gray and A. Reuter, "Transaction processing: Concepts and Techniques", San Mateo, Calif.: Morgan Kaufmann 1993 give further details on these aspects.

Availability of a certain system or application has at least two aspects: in a first, narrow significance it relates to the question, whether a certain system is active at all providing its services; in a second, wider significance it relates to the question, whether this service is provided in a timely fashion offering a sufficient responsiveness.

As outlined in further details by D. Loshin, "High performance computing demystified", Academic Press, Inc., 1994 and K. Hwang, Advanced computer architecture: Parallelism, Scalability, Programmability, PMcGraw-Hill, Inc., 1993 and J. Gray and A. Reuter, "Transaction processing: Concepts and Techniques", San Mateo, Calif.: Morgan Kaufmann 1993 one fundamental mechanism to improve availability is based on "redundancy": The availability of hardware is improved by building clusters of machines and the availability of software is improved by running the same software in multiple address spaces.

With the advent of distributed systems, techniques have been invented which use two or more address spaces on different machines running the same software to improve availability (often called active replication). Further details on these aspects may be found in S. Mullender, "Distributed Systems", ACM Press, 1993. In using two or more address spaces on the same machine running the same software which gets its request from a shared input queue the technique of warm backups is generalized by the hot pool technique.

C. R. Gehr et al., "Dynamic Server Switching for Maximum Server Availability and Load Balancing", U.S. Pat. No. 5,828,847 teaches a dynamic server switching system relating to the narrow significance of availability as defined above. The dynamic server switching system maintains a static and predefined list (a kind of profile) in each client which identifies the primary server for that client and the preferred communication method as well as a hierarchy of successively secondary servers and communication method pairs. In the event that the client does not have requests served by the designated primary server or the designated communication method, the system traverses the list to ascertain the identity of the first available alternate server-communication method pair. This system enables a client to redirect requests from an unresponsive server to a predefined alternate server. In this manner, the system provides a reactive server switching for service availability.

In spite of improvements of availability in the narrow sense defined above, this teaching suffers from several shortcomings. Gehr's teaching provides a reactive response only in case a primary server could not be reached at all. There are no proactive elements which prevent a client requests service from a non-responsive server. As the list of primary and alternate servers is statically predefined, there may be situations in which no server could be found at all or in which a server is found not before several non-responsive alternate servers have been tested. Moreover, Gehr's teaching does not allow for a dynamic workload balancing improving the availability in the wider sense, i.e. the responsiveness. According to Gehr, different clients might be controlled by different lists of servers, which allow for a rudimentary and static workload balancing as different clients might send their requests to different servers. In a highly dynamic, worldwide operating network situation, where clients and servers permanently enter or leave the network and where the access pattern to the servers may change from one moment to the next, Gehr's teaching to improve the responsiveness is not adequate.

Another area of technology to be mentioned is the area of Transaction Processing monitors (TP monitors). TP monitors have been invented more than three decades ago to make effective use of expensive system resources (J. Gray and A. Reuter, "Transaction processing: Concepts and Techniques", San Mateo, Calif.: Morgan Kaufmann 1993): Ever increasing numbers of users had to be supported by a system, and it turned out that native operating system functionality did not suffice to allow this. A TP monitor as a layer on top of the operating system manages system resources at a much finer granularity, assigns them with care, and only if needed and only for the duration needed. As a result, for one and the same machine and operating system, a given application can support orders of magnitudes of more users when implemented in a TP monitor than when implemented based on native operating system features.

The very complex and sophisticated TP monitor technology is primarily limited to a certain server only and thus does not solve the availability problem of a distributed network of application servers.

With the advent of distributed systems supporting middleware, object request brokers (be it a CORBA implementation, or DCOM, or based on the Java beans model) favor commodity cluster environments, i.e. environments which are composed out of relatively cheap hardware; refer for instance to G.F. Pfister, In search of clusters—2nd edition (Prentice Hall PTR, 1998). In such environments, the service providing software components are simply replicated on multiple machines to ensure scalability. But this requires a mechanism to assign service requests to the various service providers ensuring the effective exploitation of the cluster resources. As a consequence, the middleware implementing the distributed system has to deal with similar problems as traditional TP monitors did before (by the way, this is one of the reasons why such systems are considered as "TP monitor like systems" today). In fact, the middleware is representing a single and central TP monitor.

These "TP monitor like systems" are much too complicated to develop as well as to administer. Moreover they themselves consume a significant amount of processing resources.

Despite of all of this progress, further improvements are urgently required supporting enterprises in increasing the availability of their applications and allowing for instance for electronic business on a 7 (days) * 24 (hour) basis; due to the ubiquity of worldwide computer networks at any point in time somebody might have interest in accessing a certain application server.

SUMMARY OF THE INVENTION

An object of the invention is to increase the availability of a multitude of application servers providing services to a multitude of application clients.

It is a further object of the invention to increase the availability by providing a technology, which is highly responsive to dynamic changes of the availability of individual application servers within the network and which supports a less centralized decision process for workload balancing.

The invention relates to a technology of workload balancing for improved availability within a multitude of applications-servers and a multitude of application-clients interconnected with said application-servers by a communication network.

A proposed method comprises a first-step, wherein an application-client is caching availability data of a subset of currently active application-servers as potential target application-servers.

The method comprises a second-step, wherein for execution of an application-request the application-client selects an application-server from the subset based on a load-balancing decision of the application-client as target application-server. Finally the application-request is sent to the target application-server. of the application-client as target application-server. Finally the application-request is sent to the target application-server.

The proposed technology increases the availability and scalability of a multitude of application servers providing services to a multitude of application clients. The current invention provides a proactive technology as it incorporates in the workload balancing decisions only application servers which are active, i.e. which actually are providing their services to application clients. This prevents that a client generates erroneous request routings requesting service from non-responsive servers. Through caching of availability data of active servers, a dynamic technique with ongoing processing is suggested being highly responsive to dynamic network situation where clients and servers permanently enter or leave the network and where the access pattern to the servers may change from one moment to the next. Thus, the invention can accommodate hot plug-in of server machines into application clusters, thus further increasing the scalability of the environment. Complicated administration efforts to associate application clients with application servers are complete avoided. By teaching that the application clients are executing the load-balancing decisions a less centralized decision process for workload balancing is supported. Significant processing burden is removed from the servers, where, according to the state of the art, the workload balancing decisions would be performed and which typically build the primary bottleneck for processing resources. Caching only a subset of active application servers in the application clients allows for an efficient usage of the limited resources on the client side: depending on the size of the subset efficient load balancing decisions can be performed by a client. It does not prerequisite a workload management facility within the environment, which eventually also eases the implementation of application servers.

These and other objects will be apparent to one skilled in the art from the following drawings and detailed description of the invention.

DESCRIPTION OF THE PREFERRED EMBODIMENT

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

If the current specification is referring to an application it may be a computer program of any nature not limited to any specific type or implementation. The terms application client and application server have to be understood from a logical point of view only relating to some type of "instance". These terms do not distinguish necessarily different address space or even different computer systems.

The current invention is assuming a certain communication path between application client and application server; this does not mean that the invention is limited to a certain communication paradigm.

Also if the current specification is referring to a "database" the term is to be understood in a wide sense comprising not only actual databases (like relational, hierarchical databases etc.) but also simple files and the like.

Introduction and Problem

Enterprises depend on the availability of the systems supporting their day-to-day operations. A system is called available if it is up and running and is producing correct results. In a narrow sense, the availability of a system is the fraction of time it is available. In a second, wider sense availability relates to the question, whether an application service is provided in a timely fashion offering a sufficient responsiveness.

Figure 1:
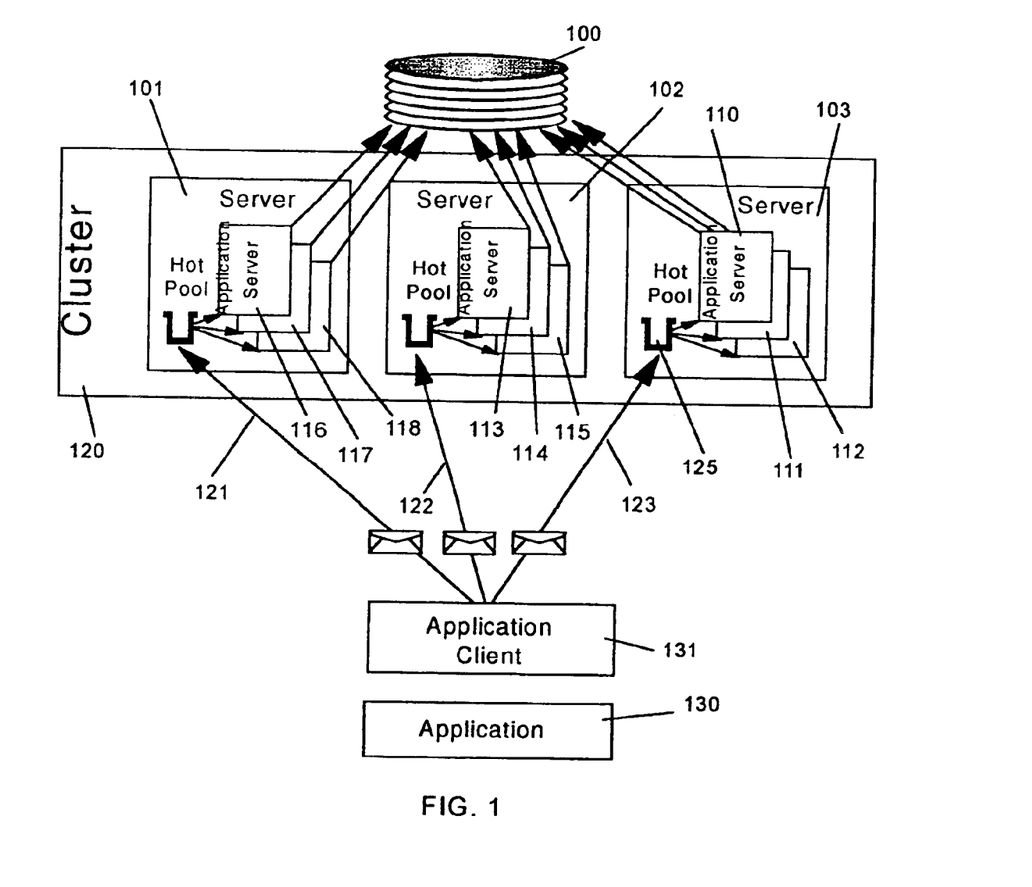
FIG. 1 is a diagram reflecting the concepts of an application server, a hot pool, an application cluster and an application client.

In specific the current invention is relating to environments called "application cluster" based on the following concepts which are also depicted in FIG. 1:

An application server (110, 111 or 112) is an executable implementing a collection of related services—for instance including access to some shared remote database (100). A hot pool (110, 111, 112) is a collection of address spaces each of which runs the same application server and each of these application servers receive requests from an input queue (125), which is shared between the hot pool members. By a server machine (101, 102 or 103) we mean a certain physical machine which hosts a hot pool of application servers. An application cluster (120) is a collection of servers which fail independently and each server hosts a hot pool of application servers of the same kind.

Applications (130) request services from application servers via application clients. An application client (131) is an executable which runs on the same machine as the application and which communicates with a server on behalf of the application. If the communication between the application client and a server is based on (asynchronous) reliable message exchange, the application server is said to be message based. In what follows we do assume message based communication between application clients and application servers; of course the invention is not limited to the message based communication paradigm as other paradigms may be used instead. Consequently, an application client requests the performance of a certain service by sending a corresponding message into the input queue of a hot pool of associated application servers on a particular machine.

Traditional workload management is often server-centric and very sophisticated, thus, hard to implement: It takes the particular environment into account, i.e. it is often geared towards the underlying operating system or even hardware environment. Thus, the corresponding components and even the basic concepts are not portable. These server-centric approaches do not solve the availability problem of a distributed network of application servers. These "TP monitor like systems" are much too complicated to develop as well as to administer. Moreover they themselves consume a significant amount of processing resources.

As the basic approach the current invention is starting from the observation that in application cluster environments, a much less sophisticated workload management suffice because the used machine resources (commodity clusters) are usually much cheaper and thus, a request distribution which is to a certain degree uneven (or sub optimal) can be tolerated.

Without workload management performed by the system itself, each client submits requests to a predefined server machine, i.e. an administrator must assign a target machine to each client: This is a cumbersome administrative task, typically resulting in a bad resource exploitation. A typical example of this category is the teaching of Gehr et al. as discussed above.

Furthermore, adding new machines to the application cluster environment requires additional administrative actions. As the plugged-in machines will receive requests only once associated with at least one client an administrator would have to make corresponding administrative decisions.

But such an approach is inadequate in a highly dynamic network situation where clients and servers permanently enter or leave the network and where the access pattern to the servers may change from one moment to the next.

A desired solution to these problems should therefore provide a proactive technology which automatically determines application servers entering (hot plug-in) or leaving the cluster, which is responsive to sudden changes of the access pattern of the multitude of application clients and which provide a less centralized decisions process for the balancing problem.

Basic Idea of the Solution

The fundamental principle of the current invention is that (elementary but also sophisticated) load balancing can be performed at the client site to ease the implementation of application server, i.e. application functions; in an ongoing process the server site may provide availability data on application servers and may thus influence load balancing decisions indirectly, but is not required to do so. To be more precise, it is the application client that performs load balancing, not the application server and not the exploited communication subsystem (e.g. messaging middleware, RPC middleware etc.). Nevertheless, the server site may assist the application client in workload management. Therefore in view of more advanced embodiments of the current invention the current teaching could be described as an application server assisted workload balancing of the application clients. Based on this principle a less centralized decisions process for the balancing problem has been introduced.

Figure 2:
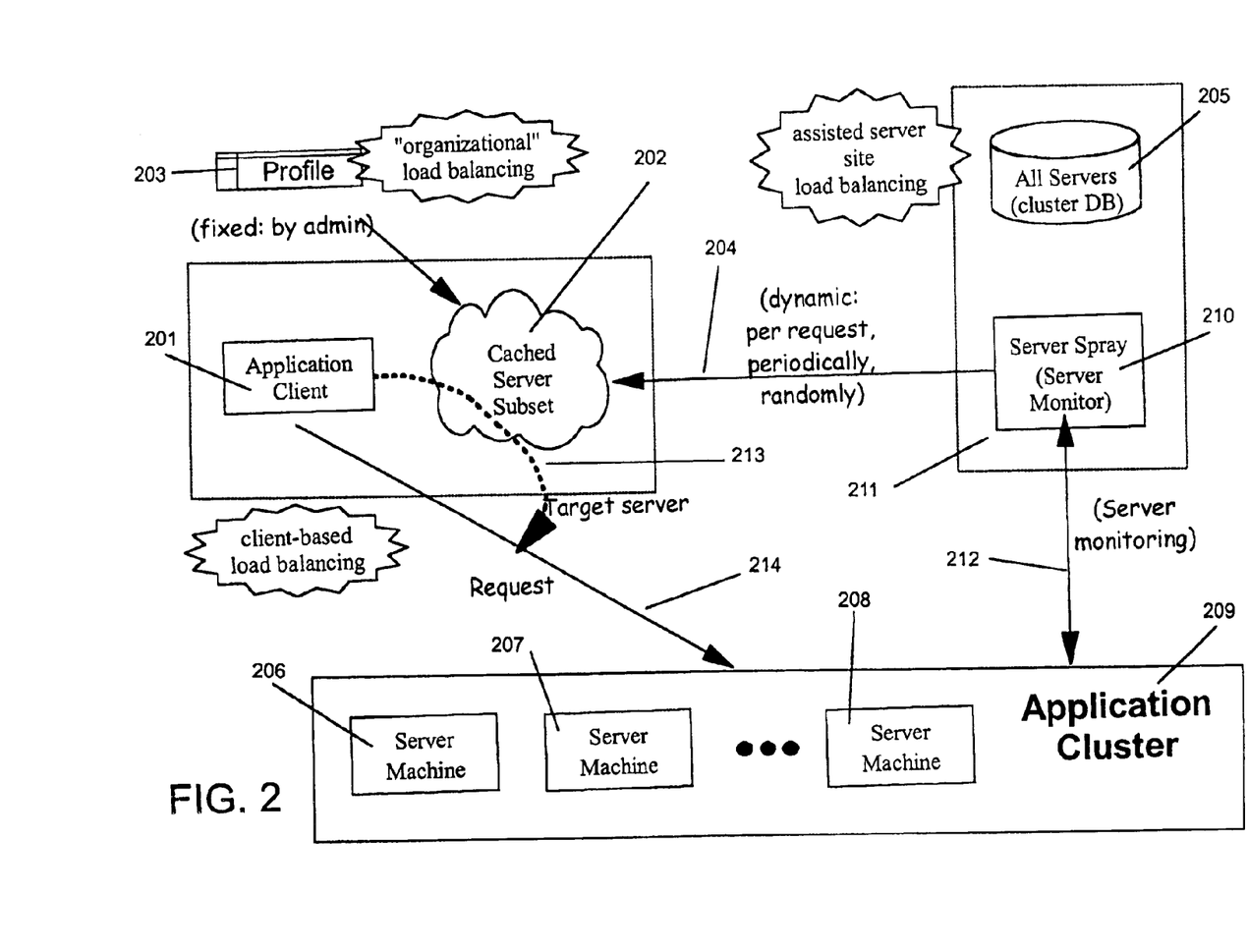
FIG. 2 is an overview of the basic concepts of the current invention.

The further features of the current invention are described by referring to overview given in FIG. 2.

Associating Server Subsets To Clients

For the purpose of associating a certain application client with a certain subset of application servers the application client (201) caches a chosen subset of server machines as potential targets for its service requests (202). As indicated by the term cache, this subset of application servers may be volatile in nature and may undergo permanent changes. Different mechanisms can be used to determine such a subset for each application client which of course may be different for different clients:

1. Via profiling each application client can be associated with a fixed subset (203) of the multitude of all application servers. From this set the application client can make its choice of targets. This subset can be fixed for all requests, or it can vary from request to request. Of course the profile (203) may undergo changes while an application client is active; these changes will then be reflected in the cached subset (202).

2. The application client can retrieve (204) from a "cluster database" (205) the necessary topology information, i.e. which servers build the cluster (209) of active application servers (206, 207, 208). This topology lookup can be done when the application client is started, or it can be done for each request (before or after the request is issued) or any combination of this. Doing it not just at startup time allows to consider even servers that have been hot plugged in recently, i.e. in this case also application servers which just became active or inactive will be reflected (an aspect which will be discussed further below).

That (sub)set generally stores availability data of currently active application servers. In the simplest case only the identity of the currently active application servers may be comprised. But in other embodiments of the invention for instance also the processing power of the individual server and/or their current workload or other availability related data may be reflected.

If the server subset is based on a profiling approach as indicated in (1) above, different mechanisms can be used to determine the corresponding subset, for example:

i. The subsets associated with each client can be evenly distributed across all application clients in (the assumed) case that all application clients produce (on the average) the same workload.

ii. The subsets are determined according to the expected workload generated by a client; for instance application clients with a large expected workload could be associated with application servers with great processing power and/or application clients with a large expected workload could be associated with subsets with no or a modest intersection only. Of course many other distribution strategies are possible.

If the server subset is based on topology lookup, as indicated in (2) above, a component called "server monitor" or "server spray" (210) is introduced The server spray actually accepts lookup requests and returns subsets of servers. Moreover the server spray is monitoring (212) the activity status of the application servers within the cluster. Thus, the server spray can be viewed as a server assisted workload balancing feature for application clients. The server spray may be located on a separate application server (211) or may be executing on one of the application servers (206–208), which also provide application services to the clients. In performing the server subsetting, the server spray can i. randomly choose a subset of (available) servers from the cluster database (called simple topology lookup). This approach attempts to generate a workload distribution on the multitude of application servers, which in the mean is the same on all application servers.

ii. apply its own load balancing algorithm to figure out the appropriate subset returned to the requesting application client (called load balanced topology lookup). In this case, load balancing is assisted by the server site; nevertheless, this does not impact the application clients' load balancing mechanism as it provides a decision space within the clients' load balancing mechanism is operating. Existing algorithms or components might be reused to implement load balanced topology lookup on the client side.

Load balanced topology lookup might be considering the number of clients already assigned to a particular server, thus evenly distributing subsets of servers across application clients; this might be appropriate in case all application clients produce (on the average) the same workload. It might be more sophisticated by requiring for instance that each application client must indicate the expected amount of workload to be generated (for instance by simply specifying a "load class" with the lookup request). The returned subset might be impacted by this specification as it may be based on a load-balancing decision of the server spray taking into account the indication of the expected amount of workload, the application-servers processing power and/or the application-servers work load.

Client-Based Workload Balancing

The following outline on client-based workload balancing is independent from the mechanism used to determine the cached server subset, i.e. it can be based on profiling, simple topology lookup, or load balanced topology lookup. It is assumed that the elements of a server subset are "weighted" to reflect processing power and/or any other relevant characteristics relating to the availability of the individual application servers; note, that the case of non-weighted servers is covered by assigning the same weight to all servers.

Before issuing an application request, an application client selects (213) a certain one of the application servers comprised by the cached subset (202) as target application sever to send (214) the request to. The basic approach of the current invention is that this selection is base on a load-balancing decision of said application client. This basically realizes client-based workload management.

Various approaches can be used for this load balancing decision. For instance the application client could select the target application server randomly from the cached subset. If the availability data comprised by the subset stores the "weight" of the servers, for instance expressing the processing power and/or the application servers work load (for instance expressed by the depth of the input queue, last observed response time etc.), much more sophisticated load balancing methods can be used on the client side. Whatever load balancing method is exploited it is preferably utilized for approximating a even distribution of workload within said subset of application servers.

In doing so, each application client supports the even distribution of requests across all application servers available in the application cluster. Load balanced topology lookup might even amplify this effect Ensuring an even distribution of requests results in the exploitation of all available resources in the overall environment, i.e. in scalability within the available boundaries.

Hot Plug-In Of Application Servers

Scalability is improved via hot plug-in of additional servers (i.e. application servers, which became active, or servers, which became inactive by have been removed from service) and delivering the information about new servers to all or selective application clients. The latter information can either be "pushed" (i.e. the server spray is taking initiative to send that information) to the clients or "pulled" (i.e. the application clients explicitly are requesting that information) by them.

"Pushing" this information in a single burst to all clients might swamp the network severely impacting the network throughput of "real" requests. This impacts the scalability of the overall environment and is thus avoided by the current invention. Instead, the push approach suggested here might be called lazy multi-casting, meaning that the server spray selects iteratively (with a time delay) subsets of application clients to which information about the newly added or removed server is sent. Again, much sophistication can be applied in determining the proper subsets of application clients and sequencing of the submission of this information.

Pulling this information requires that application clients perform from time to time a topology lookup (204): Such a lookup can be done whenever a client request has to be processed (before or after sending an application request), periodically, or randomly. This ensures that whenever a new server got added to the application cluster after a certain period of time it will receive service requests. In pulling topology information to refresh the server subset in its cache, an application client fundamentally supports scalability via hot plug-in of servers in commodity clusters.

When a new server machine is plugged in, the server spray could select collections of logged-in clients in a random fashion: It withdraws from their cached server subset randomly chosen servers and either pushes the corresponding update into their set or waits until they pull for topology information. If the mechanism used does not store persistently for each application client its cached server subset, the application client will ignore the withdrawal if the server is not within the cached set of the application client. Again, to avoid network swamping, only a few application clients at a time get the modifications to their server subset pushed.

Maintaining The Set Of Available Servers

Workload management functions consider the amount of resources available on each server for processing client requests. On each server, this amount can be perceived as a continuous function in time of course depending on the status of work formerly submitted to the server. But these functions typically assume that the subject server is up and running in a high availability sense: if the server failed, these function may produce incorrect results based on the historical status and the inherent assumption of "always being up and running". I.e. the workload function might return a value from the interval [0,1] although the real value of available resources is "0" because the server is not available at all, i.e. it does not provide any computing resources. Thus, by adding fault detection workload management will become more precise.

Figure 3:
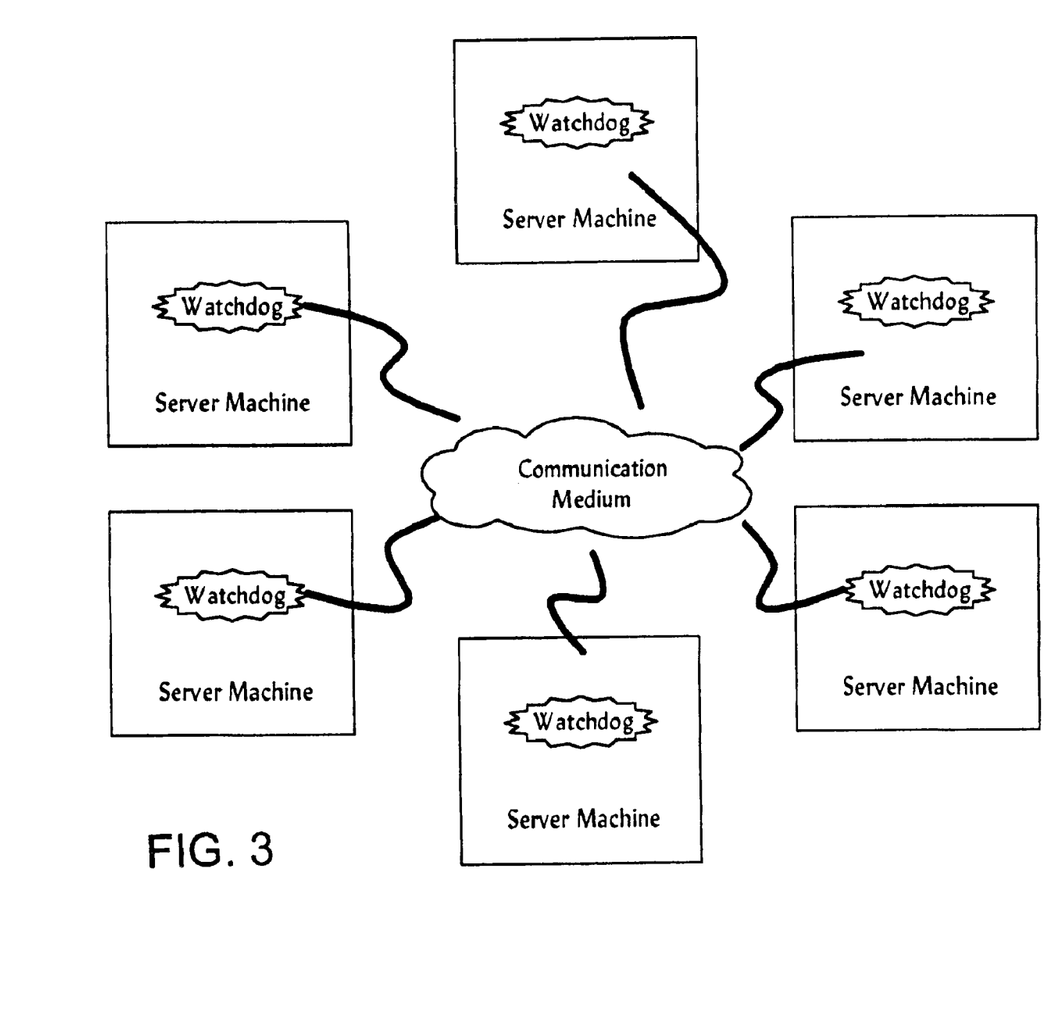
FIG. 3 visualizes the "watchdog monitoring" approach of the current invention according to which the watchdogs are monitoring not only the current activity status of there associated application servers but also are monitoring the activity status of other watchdogs.

Each hot pool on a server of an application cluster is monitored by a "watchdog". Such a watchdog detects failed hot pool members and recreates them immediately in an automatic manner, this is depicted in FIG. 3. The current invention in addition suggests that the collection of watchdogs in an application cluster monitor themselves ("watchdog watchdogging" or watchdog monitoring). This is achieved via a communication medium that allows to run a protocol to receive information about the state of a hot pool on a given machine; for instance "heartbeat" protocols could be used for that purpose. When one of the server of the application cluster falls the watchdog on this server will be detected to have failed (with a latency that depends on the monitoring protocol used) by other watchdogs. As a result, the remaining watchdogs will be able to multi-cast this fact and send this information to the server spray (which will maintain the cluster database accordingly) so that the workload functions can make use of this information avoiding to schedule requests to the failed server. Similarly, when the server is available again the watchdogs will detect that. Once the workload functions got that information new requests can be submitted to the recreated server. The proposed approach significantly improves the responsiveness of the cluster as it is avoided that application requests are sent to non-responsive servers; moreover processing resources are detected as soon as they become available and are included in the workload balancing process.

Thus according to the "watchdog monitoring" approach of the current invention, the watchdogs are monitoring not only the current activity status of there associated application servers but also are monitoring the activity status of other watchdogs.

Advantages of the Invention

The proposed technology increases the availability and scalability of a multitude of application servers providing services to a multitude of application clients. The current invention is providing a proactive technology as it incorporates in the workload balancing decisions only application servers which are active, i.e. which actually are providing their services to application clients: This prevents that a client generates erroneous request routings requesting service from non-responsive servers. Through caching of availability data of active servers a dynamic technique and ongoing process is suggested being highly responsive to dynamic network situation where clients and servers permanently enter or leave the network and where the access pattern to the servers may change from one moment to the next. Thus the invention can accommodate hot plug-in of server machines into application clusters further increasing the scalability of the environment.

Complicated or due its sheer complexity impossible administration efforts to associate application clients with application servers are complete avoided. By teaching that the application clients are executing the load-balancing decisions a less centralized decision process for workload balancing is supported. Significant processing burden is removed from the servers, where according to the state of the art the workload balancing decisions would be performed and which typically build the primary bottleneck for processing resources. Caching only a subset of active application servers in the application clients allows for an efficient usage of the limited resources (in terms of storage and processing power) on the client side: depending on the size of the subset efficient load balancing decisions can be performed by a client. Due to the teachings independence from the concrete algorithms for workload balancing the reuse of existing general purpose load balancing algorithms are possible. The proposed concepts are portable in the sense that its mechanisms do not require hardware or software specific implementations (like highly specialized TPA Monitors do). As a result, it ensures a common behavior across environments. It does not prerequisite a workload management facility within the environment, which eventually also eases the implementation of application servers.

According to a certain embodiment of the invention, a single cluster database suffices as the only centralized feature, which in addition can be implemented easily with state of the art technology.

An embodiment wherein the active application servers are distributed approximately evenly over the various subsets of the various application clients turns out to be an efficient approach: such subsets can be determined performance-efficiently without increasing workload considerably. Already an approximately even distribution of the application servers ensures that the probability that a servers is overrun is significantly reduced, that the overall throughput to the cluster is improved, that availability and responsiveness of the application servers is improved and that at the same time also improved scalability is offered.

The further embodiment of the invention introducing a server monitor or "server spray" simplifies the implementation of the application client. A mere retrieve request suffices to determine the subset, complicate database on the client side accesses are avoided. Finally the more resource expensive monitoring and administering of the complete set of application servers can be executed outside an application client on a more powerful system; thus the application clients have to cope with the much smaller subset only.

As a further advantage the server monitor could offer additional assistance if the subset of application servers provided is already the result of a load-balancing decision. This approach allows for a combination of global workload balancing, performed through the server monitor by prescribing to the application clients a "workload control space" (the subset), and a decentralized workload balancing, performed by the individual application clients balancing issued requests within its assigned subset.

An embodiment of the invention wherein an application client sends an indication of the expected amount of workload to be generated to the server monitor permits the server monitor to make a more precise workload balanced subset selection leading to improved workload balancing decisions. Or on the other hand on the client side less sophisticated workload balancing methodologies can be applied without effecting the overall availability and scalability.

As further advantage the application, client may perform any type of workload balancing on the subset of application servers which may be adapted to the client's processing capabilities. This may range from a very economic but nevertheless efficient random selection to a more sophisticated workload balancing decision exploiting the application servers processing power, its current workload or its observed response time.

A further significant advantage is that the current teaching supports various degrees of the actuality of the availability data of the cached subset. It may range from a random or periodically actualization up to an actualization per request. Eventually the lazy-multi-cast approach combines high actuality of the availability data of the cached subset with a modest load on the network.

The introduction of watchdogs monitoring the activity status of its corresponding local application server which then inform the server monitor, guarantees a decentralized and thus efficient monitoring approach. By allowing in addition a watchdog to check the activity of other watchdogs, the problem of "checking the checker" is solved.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computerized method of workload balancing for improved availability within a multitude of applications-servers and a multitude of application-clients interconnected with said application-servers by a communication network, said method comprising
    caching within an application-client, availability data of a subset of currently active application-servers as potential target application-servers,
    selecting by execution of an application-request by said application-client, an application-server from said subset based on a load-balancing decision of said application-client as target application-server and is sending said application-request to said target application-server,
    retrieving by said application-client, said subset of currently active application-servers from a cluster database, said cluster database storing availability data of currently active application-servers,
    retrieving said subset of currently active application-servers by issuing a retrieve request to a server-monitor, said server-monitor monitoring said application-servers activity status,
    sending by said application-client together with said retrieve request, an indication of the expected amount of workload to be generated by said application-client, and
    basing said server-monitor's load-balancing decision on said indication of the expected amount of workload and/or said application-servers processing power and/or said application-servers work load.

2. A method of workload balancing according to claim 1 further comprising,
    choosing said subset of currently active application-servers by approximating an even distribution of said application-servers with respect to other subsets of other application-clients.

3. A method of workload balancing according to claim 1 further comprising,
    choosing by said server-monitor, said subset of currently active application-servers from said cluster database by a random selection.

4. A method of workload balancing according to claim 1 further comprising,
    choosing by said server-monitor, said subset of currently active application-servers from said cluster database based on a load-balancing decision of said server-monitor.

5. A method of workload balancing according to claim 4 further comprising,
    choosing by said server-monitor, said subset of currently active application-servers by approximating an even distribution of said application-servers with respect to other subsets of other application-clients.

6. A method of workload balancing according to claim 1, wherein selecting by said application-client comprises selecting said target application-server randomly.

7. A method of workload balancing according to claim 1, wherein said availability data of said subset of currently active application-servers comprises said application-servers processing power and in addition said application-servers work load or said application-servers observed response time and wherein selecting by said application-client comprises selecting said target application-server approximating an even distribution of workload within said subset of currently active application-servers.

8. A method of workload balancing according to claim 1 further comprising,
    dynamically updating said availability data of said subset of currently active application-servers by explicitly requesting from said server-monitor an update of said subset of currently active application-servers, and/or
    dynamically updating by said server-monitor, said availability data of said subset of currently active application-servers by receiving an update of said subset of currently active application-servers.

9. A method of workload balancing according to claim 8, wherein said explicitly requesting from said server-monitor an update of said subset of currently active application-servers occurs at one of:
    prior to an application-request, or
    after sending an application-request, or
    periodically, or
    randomly.

10. A method of workload balancing according to claim 8, wherein, in the event an additional application-server has become active or if an active application-server has become inactive, said server-monitor takes the initiative of sending said update of said subset of currently active application-servers.

11. A method of workload balancing according to claim 10,
    wherein said server-monitor sending said update of said subset of currently active application-servers comprises a lazy-multi-cast including;
    iteratively selecting with a time delay, a collection of application-clients for said multitude of application-clients, and
    sending each application-client of said collection an update of said subset of currently active application-servers.

12. A method of workload balancing according to claim 1, wherein said application-servers each comprise a hot pool of one or a multitude of application-instances, said application-servers being executed in the same or a multitude of address-spaces, and
    wherein for each of said hot pools a watchdog is monitoring said hot pool's activity status, and
    wherein each of said watchdogs is informing said server-monitor on the workload of said monitored application-servers and its current activity status.

13. A method of workload balancing according to claim 12,
    wherein at least one of said watchdogs is monitoring the activity status of other watchdogs and, in the event that said one watchdog detects the unavailability of any one of said other watchdogs, said one watchdog informs said server-monitor of said corresponding activity status and said server-monitor updates said cluster database accordingly.

14. An apparatus for workload balancing giving improved availability within a multitude of applications-servers and a multitude of application-clients interconnected with said application-servers by a communication network, said apparatus comprising means for caching within an application-client, availability data of a subset of currently active application-servers as potential target application-servers, means for selecting by execution of an application-request by said application-client, an application-server from said subset based on a load-balancing decision of said application-client as target application-server and is sending said application-request to said target application-server, means for retrieving by said application-client, said subset of currently active application-servers from a cluster database, said cluster database storing availability data of currently active application-servers, means for retrieving said subset of currently active application-servers by issuing a retrieve request to a server-monitor, said server-monitor monitoring said application-servers activity status, means for sending by said application-client together with said retrieve request, an indication of the expected amount of workload to be generated by said application-client, and means for basing said server-monitor's load-balancing decision on said indication of the expected amount of workload and/or said application-servers processing power and/or said application-servers work load.

15. An apparatus for workload balancing according to claim 14 further comprising, means for choosing said subset of currently active application-servers by approximating an even distribution of said application-servers with respect to other subsets of other application-clients.

16. An apparatus for workload balancing according to claim 14 further comprising, means for choosing by said server-monitor, said subset of currently active application-servers from said cluster database by a random selection.

17. An apparatus for workload balancing according to claim 14, means for choosing by said server-monitor, said subset of currently active application-servers from said cluster database based on a load-balancing decision of said server-monitor.

18. An apparatus for workload balancing according to claim 17 further comprising, means for choosing by said server-monitor, said subset of currently active application-servers by approximating an even distribution of said application-servers with respect to other subsets of other application-clients.

19. An apparatus for workload balancing according to claim 14, wherein said means for selecting by said application-client comprises means for selecting said target application-server randomly.

20. An apparatus for workload balancing according to claim 14, wherein said availability data of said subset of currently active application-servers comprises said application-servers processing power and in addition said application-servers work load or said application-servers observed response time and wherein means for selecting by said application-client comprises means for selecting said target application-server approximating an even distribution of workload within said subset of currently active application-servers.

21. An apparatus for workload balancing according to claim 14 further comprising, means for dynamically updating said availability data of said subset of currently active application-servers by explicitly requesting from said server-monitor an update of said subset of currently active application-servers, and/or means for dynamically updating by said server-monitor, said availability data of said subset of currently active application-servers by receiving an update of said subset of currently-active application-servers.

22. An apparatus for workload balancing according to claim 21, wherein said explicitly requesting from said server-monitor an update of said subset of currently active application-servers occurs at one of:
prior to an application-request, or
after sending an application-request, or
periodically, or
randomly.

23. An apparatus for workload balancing according to claim 21, wherein, in the event an additional application-server has become active or if an active application-server has become inactive, said server-monitor takes the initiative of sending said update of said subset of currently active application-servers.

24. An apparatus for workload balancing according to claim 23, wherein said server-monitor sending said update of said subset of currently active application-servers comprises a lazy-multi-cast including;

means for iteratively selecting with a time delay, a collection of application-clients for said multitude of application-clients, and means for sending each application-client of said collection an update of said subset of currently active application-servers.

25. An apparatus for workload balancing according to claim 14, wherein said application-servers each comprise a hot pool of one or a multitude of application-instances, said application-servers being executed in the same or a multitude of address-spaces, and wherein for each of said hot pools a watchdog is monitoring said hot pool's activity status, and wherein each of said watchdogs is informing said server-monitor on the workload of said monitored application-servers and its current activity status.

26. An apparatus for workload balancing according to claim 25, wherein at least one of said watchdogs is monitoring the activity status of other watchdogs and, in the event that said one watchdog detects the unavailability of any one of said other watchdogs, said one watchdog informs said server-monitor of said corresponding activity status and said server-monitor updates said cluster database accordingly.

27. A computer program product comprising a computer usable medium having computer readable program code means therein for workload balancing giving improved availability within a multitude of applications-servers and a multitude of application-clients interconnected with said application-servers by a communication network, said computer program product comprising > computer readable program code means for caching within an application-client, availability data of a subset of currently active application-servers as potential target application-servers,
>
> computer readable program code means for selecting by execution of an application-request by said application-client, an application-server from said subset based on a load-balancing decision of said application-client as target application-server and is sending said application-request to said target application-server,
>
> computer readable program code means for retrieving by said application-client, said subset of currently active application-servers from a cluster database, said cluster database storing availability data of currently active application-servers,
>
> computer readable program code means for retrieving said subset of currently active application-servers by issuing a retrieve request to a server-monitor, said server-monitor monitoring said application-servers activity status,
>
> computer readable program code means for sending by said application-client together with said retrieve request, an indication of the expected amount of workload to be generated by said application-client, and
>
> computer readable program code means for basing said server-monitor's load-balancing decision on said indication of the expected amount of workload and/or said application-servers processing power and/or said application-servers work load.

28. The computer program product for workload balancing according to claim 27 further comprising, > computer readable program code means for choosing said subset of currently active application-servers by approximating an even distribution of said application-servers with respect to other subsets of other application-clients.

29. The computer program product for workload balancing according to claim 27 further comprising, > computer readable program code means for choosing by said server-monitor, said subset of currently active application-servers from said cluster database by a random selection.

30. The computer program product for workload balancing according to claim 27,

> computer readable program code means for choosing by said server-monitor, said subset of currently active application-servers from said cluster database based on a load-balancing decision of said server-monitor.

31. The computer program product for workload balancing according to claim 30 further comprising, > computer readable program code means for choosing by said server-monitor, said subset of currently active application-servers by approximating an even distribution of said application-servers with respect to other subsets of other application-clients.

32. The computer program product for workload balancing according to claim 27,

> wherein said computer readable program code means for selecting by said application-client comprises computer readable program code means for selecting said target application-server randomly.

33. The computer program product for workload balancing according to claim 27,

> wherein said availability data of said subset of currently active application-servers comprises said application-servers processing power and in addition said application-servers work load and/or said application-servers observed response time and wherein computer readable program code means for selecting by said application-client comprises computer readable program code means for selecting said target application-server approximating an even distribution of workload within said subset of currently active application-servers.

34. The computer program product for workload balancing according to claim 27 further comprising, > computer readable program code means for dynamically updating said availability data of said subset of currently active application-servers by explicitly requesting from said server-monitor an update of said subset of currently active application-servers, or
>
> computer readable program code means for dynamically updating by said server-monitor, said availability data of said subset of currently active application-servers by receiving an update of said subset of currently active application-servers.

35. The computer program product for workload balancing according to claim 34,

> wherein said explicitly requesting from said server-monitor an update of said subset of currently active application-servers occurs at one of:
> prior to an application-request, or
> after sending an application-request, or
> periodically, or
> randomly.

36. The computer program product for workload balancing according to claim 34,

> wherein, in the event an additional application-server has become active or if an active application-server has become inactive, said server-monitor takes the initiative of sending said update of said subset of currently active application-servers.

37. The computer program product for workload balancing according to claim 36,

> wherein said server-monitor sending said update of said subset of currently active application-servers comprises a lazy-multi-cast including;
>
> computer readable program code means for iteratively selecting with a time delay, a collection of application-clients for said multitude of application-clients, and
>
> computer readable program code means for sending each application-client of said collection an update of said subset of currently active application-servers.

38. The computer program product for workload balancing according to claim 27,

> wherein said application-servers each comprise a hot pool of one or a multitude of application-instances, said application-servers being executed in the same or a multitude of address-spaces, and
>
> wherein for each of said hot pools a watchdog is monitoring said hot pool's activity status, and
>
> wherein each of said watchdogs is informing said server-monitor on the workload of said monitored application-servers and its current activity status.

39. The computer program product for workload balancing according to claim 38, wherein at least one of said watchdogs is monitoring the activity status of other watchdogs and, in the event that said one watchdog detects the unavailability of any one of said other watchdogs, said one watchdog informs said server-monitor of said corresponding activity status and said server-monitor updates said cluster database accordingly.

* * * * *